UNITED STATES PATENT OFFICE 2,415,826

EXTRACTION OF PURINE NUCLEOTIDES FROM BIOLOGIC SUBSTANCES

Louis Laufer and David R. Schwarz, New York, N. Y., assignors to Schwarz Laboratories, Inc., New York, N. Y., a corporation of New York No Drawing. Application September 15, 1943, Serial No. 502,502

16 Claims. (Cl. 260—210)

Our present invention is concerned primarily with processes for the recovery of valuable constituents from yeast and from other biologic substances that are rich in nucleic acid or in purine nucleotides as such.

The invention constitutes an improvement upon that of the prior application, Serial No. 454,838, of Louis Laufer and Jesse Charney, filed August 14, 1942, in effecting considerable economy by enhancing and expediting the yield and saving chemical reagents.

In carrying out the present invention the nucleotides are dissolved by alkaline hydrolysis, and where the substance treated is yeast or other nucleic acid bearing substance, such nucleic acid is at the same time hydrolyzed to degrade it into its four nucleotide components, all without the need for first isolating the nucleic acid, as such, from the cell complex.

In this operation undesirable constituents, including protein and gummy material unavoidably pass into solution with the nucleotides. The present invention provides a means by which such proteins and gummy substances can readily be removed from such nucleotide solution, thus rendering the solution sufficiently pure for convenient further treatment.

According to the invention such removal of protein and gummy ingredients is effected by selective precipitation thereof and the nucleotides are recovered from the final filtrate for subsequent separation therefrom of the pentose, if desired.

The resultant slurry may be filtered to recover therefrom as a by-product the insoluble materials including yeast cell walls, but in practice it is preferred to treat the slurry as such without first removing such materials therefrom.

The protein ingredients will precipitate in an acid medium, the gummy materials in an alkaline medium and the precipitation of these constituents is therefore effected successively in either order.

In a preferred procedure the protein material is removed first from the slurry, followed by removal of the gum. To this end the mass after the initial treatment with alkali is adjusted with mineral acid, preferably sulphuric acid, to substantially the isoelectric point of the proteins, and is boiled to denature and coagulate such proteins so that upon cooling they come out effectively, whereupon they are removed by mechanical separation as by filtration or centrifugation. The insoluble materials including yeast cell walls, of course, separate out in this operation if they were not previously removed and a brilliant filtrate is obtained. The precipitate may be used as a high protein feed adjunct or may be processed for other constituents.

The gums are then precipitated from the filtrate by the addition of an alkali until the optimum point for such precipitation is reached and the precipitated gums are then removed by mechanical separation as by filtration or centrifugation.

The resultant clear filtrate includes in solution the various purine nucleotides and other ingredients, but the present invention is not concerned with the latter which are inert to the subsequent treatment.

From this point on the treatment may follow closely the teaching of the prior application above-identified for precipitating the purine nucleotides as the cuprous salt thereof and for splitting off the pentose therefrom. By the present invention certain improvements have been made in some aspects of the recovery and treatment of the cuprous purine nucleotides and these will be set forth hereinafter.

In the alternative procedure, the gummy substances are precipitated and removed before the precipitation and removal of the proteins. The gums are precipitated from the original unneutralized hydrolysate, which is a relatively strong alkaline medium, by the addition of copper sulphate and from the filtrate the protein is precipitated and removed substantially as in the preferred procedure.

The invention has been above set forth in its broad and general aspects and various embodiments in detail will now be described.

In a preferred process one kilogram of pressed yeast, either brewer's or baker's yeast, is treated with 2 to 3 percent by weight of caustic soda in 50 percent solution. The mixture is heated to between 60 and 65 degrees C., and maintained at that temperature for about one hour with occasional stirring. In this operation the mixture becomes fluid and the nucleic acid becomes freed from its protein combination and is also hydrolyzed into its four nucleotide components which pass into solution together with protein and gummy constituents of the yeast.

The mass is now diluted with two litres of water and the pH of the mixture is adjusted to the pH range between 4.5 and 4.7 by the addition of concentrated sulphuric acid and thereupon boiled for from 15 to 20 minutes. The pH specified being substantially the isoelectric point of most of the yeast proteins, these pass out of solution.

The boiling helps to denature and coagulate the proteins so that when the solution has been cooled to room temperature the proteins will have settled out substantially completely. Preferably by filtration the proteins are removed together with those insoluble components of the yeast including the cell walls which were separated in the original alkali treatment. A brilliant filtrate results.

To the filtrate there is added sufficient sodium hydroxide to reach the optimum point for precipitating the gums. The alkali used, preferably sodium hydroxide, would be about 0.2 per cent by weight for a strain of brewer's yeast, of the general classification known as "*Saccharomyces cerevisiae*," but, for other strains of yeast, would be elsewhere in the range between 0.2 and 0.5 per cent by weight. The precipitated gums are removed by either filtration or centrifugation.

For precipitating the purine nucleotides the clarified filtrate is adjusted to pH 5.5 for the foregoing strain of brewer's yeast, but for other strains of yeast that adjustment would be elsewhere in the range between 5.5 and 8.5. Thereupon the solution is raised to the boiling point and 52 to 104 grams of crystalline copper sulphate are added. These crystals promptly pass into solution. While the boiling continues there is then added to the solution 10.5 to 21 grams of sodium bi-sulphite.

For best yield the amount of copper sulphate and sodium bi-sulphite added should be more or less proportional to the concentration of nucleotides in the strain of yeast employed. The foregoing quantities are best for the above identified strain of brewer's yeast.

The pH of the solution after said nucleotide precipitating agents have been added should be between 2.9 and 3.1. In that pH range a maximum, in fact a substantially quantitative precipitation of cuprous purine nucleotides occurs. The cuprous purine nucleotide precipitate is then promptly removed from the solution through a filter press or by a centrifuge.

The precipitate is washed several times with water to remove small amounts of impurities. It is then treated substantially as set forth in the prior application above-identified. Briefly stated, the cuprous purine nucleotides are hydrolyzed in sulphuric acid, the resultant cuprous purines are filtered off, the filtrate is neutralized with barium hydroxide, the resultant barium sulphate, barium phosphate and copper phosphate are filtered off; the filtrate is concentrated in vacuum, filtered, treated with activated carbon, again filtered, concentrated, transferred to diatomaceous earth-activated carbon mixture, dried in vacuum and extracted with ether-alcohol mixture. The resultant yield is substantially pure d-ribose. It varies from 1.5 to 3.0 grams per kilogram of pressed brewer's or baker's yeast, depending on the strain of yeast employed.

In the foregoing process the treatment of pressed yeast has been set forth, which is assumed to have a solid content of 30 to 35 per cent. The process could, however, be applied to liquid yeast which is assumed to have a solid content of only 10 to 15 per cent by using enough caustic in the initial hydrolyzation to bring the liquid yeast to the same state of alkalinity as set forth above for the pressed yeast.

In the alternative procedure, the gums are precipitated prior to the precipitation of the proteins. That process also can be applied to yeast, either in pressed or liquid form. For the treatment of liquid yeast, there is added to three kilograms thereof, enough 50 per cent caustic solution to make the entire mass 2 to 3 per cent caustic by weight. The slurry is held at 60 to 65 degrees C. for one hour and then cooled. Copper sulphate solution is then added, which serves to precipitate the gums, even in the relatively strong alkaline medium in which, in the absence of such copper sulphate, they would remain in solution. A 5 per cent copper sulphate solution is preferred which by volume should be between one fourth and one third of that of the solution or slurry to which it is added. In practice 875 ml. of such copper solution has been found to give best results.

After removal of the precipitated gums, as for instance, by filtration, the protein is precipitated out by the procedure above outlined and the nucleotides are precipitated and the pentose split off therefrom also in the manner above set forth. According to the procedure last set forth, the final yield of pure crystalline d-ribose is 1.0 to 2.0 grams per kilogram of pressed yeast, depending upon the strain of yeast used.

The procedure in which pressed yeast is used and the proteins are precipitated prior to precipitation of the gums is preferred because, as appears from the foregoing, it involves considerably less cost for chemicals, in fact not much more than half what is required in the alternative procedure using liquid yeast. Moreover, in the preferred process, in which the proteins are precipitated first, the separation of solid from liquid is mechanically more satisfactory and less of the desired nucleotide material is retained by the residual cake. Furthermore, the protein byproducts are uncontaminated by copper.

While the invention has been described and has its preferred application in the treatment of pressed yeast as perhaps one of the richest sources of nucleic acid, it is also applicable to the treatment of other nucleic acid bearing substances, and also of substances that contain nucleotides as such, for instance to moulds, bacteria and blood cells.

As many changes could be made in the above process and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. The process of extracting purine nucleotides from naturally occurring nucleic acid bearing biologic substance, comprising the heating of such substances in the presence of aqueous solution of caustic for hydrolysis of the nucleic acid until the nucleotide constituents are freed and pass into solution, together with gum and protein constituents of the substance and thereupon precipitating out and removing the latter constituents and finally precipitating the nucleotides from the solution.

2. The process of extracting purine nucleotides from naturally occurring nucleic acid bearing biologic substance, comprising the addition to such substance of aqueous caustic solution, the application of heat thereto until the nucleic acid has been freed from the substance and has been hydrolyzed into its nucleotide components which pass into solution, the removal from the solution by precipitation of both the gummy and the protein constituents thereof and the separation of the purine nucleotides from the residual filtrate.

3. The process of extracting purine nucleotides from yeast, comprising treating such yeast with 2 to 3 per cent by weight of sodium hydroxide in aqueous solution, maintaining the mass for in the order of one hour at a temperature in the order of 60 to 65 degrees C., thereby liberating the nucleic acid from its protein combination and also hydrolyzing it into its nucleotide components which pass into solution, while insoluble yeast constituents including cell walls remain in suspension, thereupon removing from the solution by precipitation both the gummy and the protein constituents, and separating the nucleotides from the residual filtrate.

4. The process of claim 3 in which the insoluble yeast constituents such as cell walls are removed from the slurry with the precipitate of protein constituents brought down in an acid medium and prior to the removal of the gummy constituents.

5. The process recited in claim 3 in which the insoluble yeast constituents such as cell walls are removed from the slurry with the precipitate of gummy constituents brought down by the addition of copper sulphate and prior to removal of the protein constituents.

6. The process recited in claim 3 in which the insoluble yeast constituents such as cell walls are filtered out of the slurry before precipitating out the protein and gummy substances.

7. The process of extracting purine nucleotides from naturally occurring nucleic acid bearing biologic substance, comprising the heating of such substances in the presence of aqueous solution of caustic until the nucleic acid has been hydrolyzed to said nucleotide constituents and the latter pass into solution together with gummy and protein constituents of the substance, followed by adjustment in the alkalinity or pH of the solution to a range in which one of the two classes of constituents consisting of gummy material and proteins is precipitated out and after separation of such precipitate adjusting the alkalinity or pH to the range for precipitating out the remaining class of such constituents and after removal of the latter precipitate separating out the nucleotides from the residual filtrate.

8. The combination recited in claim 7 in which the protein constituents are precipitated by the addition of mineral acid to adjust the pH to substantially the isoelectric point of such proteins at pH in the range between 4.5 and 4.7 and boiling the mixture until such precipitation is substantially complete and after filtering out the precipitate, adding caustic to adjust the alkalinity to the range for optimum precipitation of the gums.

9. The combination recited in claim 7 in which the protein constituents are precipitated by the addition of sulphuric acid to adjust the pH to substantially the isoelectric point of such proteins and boiling the mixture until such precipitation is substantially complete and after removing the precipitate by mechanical procedure, adding caustic in the range between 0.2 and 0.5 per cent by weight to the filtrate, and removing the precipitated gums by mechanical procedure.

10. The process recited in claim 7 in which the gummy constituents are precipitated by the addition of copper sulphate to the alkaline solution of nucleotides, gummy substances and proteins, and after filtering out such precipitate the filtrate is adjusted in pH to substantially the isoelectric point of the proteins and boiled until the protein matter is precipitated.

11. The process recited in claim 7 in which the gummy constituents are precipitated by the addition of 5 per cent copper sulphate solution in volume between one fourth and one third that of the alkaline solution of nucleotides, gummy substances and proteins and after filtering out such precipitate the filtrate is adjusted with sulphuric acid to a pH in the range of 4.5 to 4.7 and boiled for about fifteen minutes and then cooled to room temperature and the proteins thereby coagulated and precipitated.

12. The combination recited in claim 7 as applied to the extraction of purine nucleotides from yeast in which the solution of nucleotides, gummy substances and proteins is filtered prior to the removal of gummy substances and protein for the withdrawal of insoluble material including the yeast cell walls.

13. The combination recited in claim 7 as applied to the extraction of purine nucleotides from yeast, in which the removal of insoluble materials including the yeast cell walls separated in the original alkali treatment is effected after the precipitation of one of the group of protein and gum substances and prior to the separation of the other.

14. The combination recited in claim 7 in which the purine nucleotides are precipitated as the cuprous salts thereof.

15. The combination recited in claim 7 in which the purine nucleotides are separated out by first adjusting the filtrate to the pH range of 5.5 to 8.5, adding copper sulphate and sodium bisulphite and boiling, and thereupon mechanically removing the resulting precipitate of substantially pure cuprous purine nucleotides.

16. The combination recited in claim 7 in which the purine nucleotides are precipitated as the cuprous salts thereof by first adjusting the filtrate to the pH range of 5.5 to 8.5, adding copper sulphate and sodium bisulphite until the pH of the solution has been reduced to the range of 2.9 to 3.1, boiling, and thereupon filtering out the resulting precipitate of substantially pure cuprous purine nucleotides.

LOUIS LAUFER.
DAVID R. SCHWARZ.

REFERENCES CITED

The following references are of record in the file of this patent:

"Nucleic Acids," Levene (ACS Monograph No. 56), pp. 221–4, 229–300.